United States Patent
Redman

[11] 3,809,494
[45] May 7, 1974

[54] VANE OR BLADE FOR A GAS TURBINE ENGINE

[75] Inventor: Robert Frederick Redman, Beeston, England

[73] Assignee: Rolls-Royce (1971) Limited, London, England

[22] Filed: June 26, 1972

[21] Appl. No.: 266,508

[30] Foreign Application Priority Data
June 30, 1971 Great Britain ............ 30612/71

[52] U.S. Cl. .............................. 416/97, 415/115
[51] Int. Cl. .................................... F01d 5/08
[58] Field of Search ............... 416/96–97; 415/115

[56] References Cited
UNITED STATES PATENTS
| | | | |
|---|---|---|---|
| 3,373,970 | 3/1968 | Brockmann | 416/96 |
| 3,628,880 | 12/1971 | Smuland et al. | 416/96 UX |
| 3,628,885 | 12/1971 | Sidenstick et al. | 416/96 UX |
| 3,700,348 | 10/1972 | Corsmeier et al. | 416/96 UX |

FOREIGN PATENTS OR APPLICATIONS
| | | | |
|---|---|---|---|
| 767,546 | 11/1952 | Germany | 416/97 |
| 1,033,759 | 6/1966 | Great Britain | 416/96 |
| 1,222,565 | 2/1971 | Great Britain | 416/96 |

Primary Examiner—Everette A. Powell, Jr.
Attorney, Agent, or Firm—Cushman, Darby & Cushman

[57] ABSTRACT

A cooled vane or blade for a gas turbine engine comprises a hollow shell with chordwise internal fins which support an air entry tube. The tube receives cooling air from outside the vane and is apertured to allow the air to flow toward the leading and trailing edges of the blade. The trailing edge of the blade is slotted longitudinally to allow the cooling air to escape, and pedestals interconnect the two flanks of the trailing edge portions. Film cooling holes are provided at various locations on the blade.

4 Claims, 4 Drawing Figures

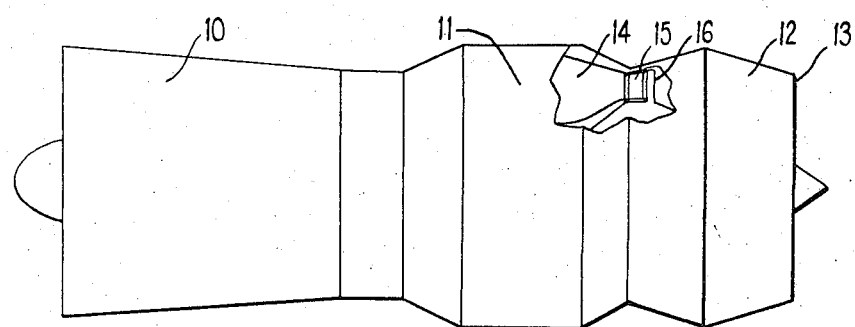
FIG.1
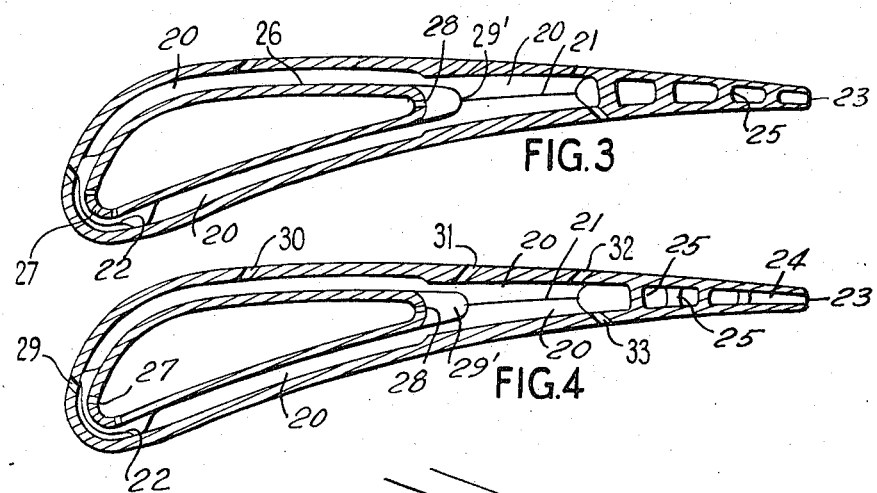
FIG.3
FIG.4
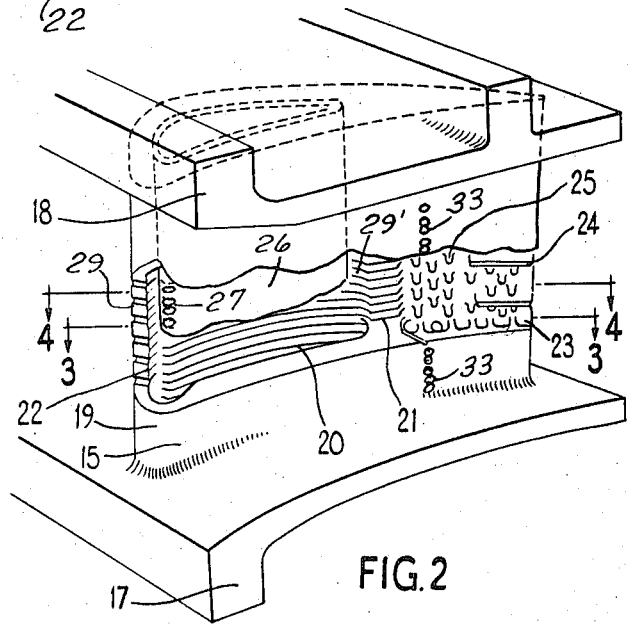
FIG.2

VANE OR BLADE FOR A GAS TURBINE ENGINE

This invention relates to a vane or blade for a gas turbine engine.

In gas turbine engines generally speaking the hotter the combustion temperature then the more efficient will be the engine. In order to allow components such as nozzle guide vanes and turbine blades to survive with very high combustion temperatures and presently available materials, it is necessary to provide some form of cooling.

The present invention provides a vane or blade which is shaped to allow particularly effective cooling.

According to the present invention a vane or blade for a gas turbine engine comprises a hollow outer shell provided with internal chordwise extending fins which support an air entry tube said tube being adapted to receive cooling air from outside the vane or blade and apertured to allow the air to flow toward the inner surfaces of the leading and trailing edges of the vane or blade, the trailing edge of the vane or blade being slotted longitudinally to allow egress of the cooling air and having pedestals interconnecting the trailing edge portions of the two flanks of the vane or blade, the remaining surface of the vane or blade being provided with holes disposed so as to allow cooling air to flow from inside the vane or blade to film cool the outer surface.

Preferably the inner surface of the leading edge of the vane or blade is provided with transverse corrugations which increase the area of heat transfer.

The trailing edge may be provided with additional struts interconnecting the flank portions and being streamlined to offer low resistance to airflow.

We prefer to position the holes in the vane or blade surface in rows extending longitudinally of the vane or blade, and in this case we prefer to position one row of holes as near to the leading edge as is possible while still maintaining the cooling air pressure greater than the external pressure at this point.

The chordwise extending fins may meet at their extremities nearest to the trailing edge of the vane or blade with the fins on the opposite flank of the vane or blade.

The invention will now be particularly described merely by way of example with reference to the accompanying drawings in which:

FIG. 1 is a diagrammatic view of a gas turbine engine partly cut away to show the location of a vane in accordance with the invention, FIG. 2 is an enlarged and partly broken away perspective view of a vane from the engine of FIG. 1, FIG. 3 is a section on the line 3—3 of FIG. 2 and FIG. 4 is a section on the line 4—4 of FIG. 2.

In FIG. 1 there is shown a gas turbine engine comprising a compressor section 10, combustion section 11, turbine section 12, and exhaust nozzle 13 all in flow series. The combustion section casing is broken away to show the combustion chamber 14, nozzle guide vanes 15 and turbine rotor blades 16.

The nozzle guide vanes 15 are shown in greater detail in FIG. 2. The guide vanes comprise inner and outer shroud portions 17 and 18 respectively which butt against similar portions on adjacent vanes to form inner and outer shroud rings. Between the portions 17 and 18 extends the aerofoil vane section 19. This section or shell is hollow and in FIG. 2 the upper portion is shown broken away so that the internal features are visible. The main feature of the hollow inside of the vane is the plurality of chordwise extending fins 20 which project from the inside of both flank portions of the blade and which are shaped to locate an air entry tube 26 which is blocked at its upper extremity and projects below the inner portion 17. The fins 20 stop short of the leading and trailing edges of the blade and a small gap 29 is left between the trailing edge of the tube and the corresponding part of the fins to allow air to flow out unobstructed; and in this embodiment the fins are joined at their ends adjacent the trailing edge to the corresponding fin on the opposite flank; this can be seen at 21 in FIG. 2 and in FIG. 3 where the section is such as to show these joined fins.

The inside of the leading edge section of the vane does not possess fins 20 but is instead formed with transverse corrugations 22 which serve to increase the surface area of the inside of the blade at the leading edge.

At the trailing edge of the blade a longitudinally extending slot 23 forms the extreme trailing edge of the blade, and in the portion of the vane adjacent the trailing edge there are provided struts 24 which are of streamlined section to avoid undue disturbance of the flow and which retain the two halves of the trailing edge together. The vane is also provided with pedestals 25 mounted in staggered rows adjacent the trailing edge; these pedestals comprise circular section members which interconnect the two flanks of the blade, and they provide strengthening of the blade in addition to improved cooling as described below.

These features are visible in FIGS. 3 and 4; in FIG. 3 only the pedestals 25 are visible while in FIG. 4 the section shows one of the struts 24. Additionally in FIGS. 3 and 4 there is visible the cooling tube 26 and it will be noted that the tube is apertured at 27 and 28 to allow cooing air to be directed towards the leading and trailing edges respectively of the vane. It will also be noted from FIGS. 3 and 4 that pluralities of film cooling holes at 29, 30, 31, 32 and 33. These holes extend from inside the vanes to the outer surface and are disposed in rows extending longitudinally of the blade as can best be seen in FIG. 2 where only the row 33 is visible.

Operation of the cooling system of the vane is as follows:

The cooling tube 26 is arranged to project externally of the inner shroud 17 and a flow of coling air is fed into the tube. From the tube 26 the air flows in the form of jets through the holes 27 to impinge upon the corrugations 22 and to effect impingement cooling of the interior surface of the leading edge. The corrugations provide a greater surface area over which the heat exchange involved can take place. The air then flows inbetween the outside of the tube and the inside of the vane between the fins 20 and provides further cooling of the inside of the flanks of the blade, the fins 20 thus effecting the dual purpose of locating the tube 26 and providing a greater surface area for heat exchange. The air then joins that which exits from the holes 28.

The air flowing rearwardly from the tube first passes inbetween the pedestals 25. These pedestals cause turbulence in the flow and therefore improve the scrubbing action of the air on the flanks of the blade; they also provide some extension of the surface area available. The air then flows out of the slot 23 between the struts 24 and provides cooling of the trailing extremity of the vane.

Additional to this flow of cooling air a proportion of the air from the inside of the vane flows directly to the outer surface through the rows of film cooling holes 29 to 33. These holes are very small (for instance 0.030 inches diameter) and are closely spaced apart and the separate flows of air through each hole will quickly join up to form a continuous film of cooling air which flows over the surface of the vane. The positioning of the rows of holes is largely determined by the available cooling air pressure and the pressure conditions existing outside the blade, but in the present case the row 29 is arranged to be as close as possible to the leading edge of the blade, the rows 30, 31 and 32 combine with the row 29 to give substantially complete coverage of the convex low pressure flank of the vane while the row 33 is mounted as far forward on the pressure side of the vane as the cooling air pressure will allow to cool as much as possible of the trailing portion of the pressure flank.

It may in some circumstances be necessary to provide some form of cooling for the blade or vane platforms.

Thus it will be seen that the blade of the invention uses a particularly simple and effective construction to provide effective cooling.

I claim:

1. A vane or blade for a gas turbine engine comprising an airfoil-shaped hollow outer shell having an outer aerodynamic surface and an interior surface defined by two spaced apart flanks, a single air entry tube extending spanwise into said hollow shell between said flanks, said tube being arranged to receive cooling air from the outside of the vane or blade and having apertures along its leading and trailing edges for discharging the air toward the leading and trailing edges of the shell, said flanks having opposed internal fins extending chordwise of but terminating short of the leading and trailing edges of the shell for supporting said air tube, said fins on one flank being joined with the corresponding fins of the other flank adjacent their trailing edge extremities with the point of junction being spaced from the trailing edge of the air tube to allow air to flow unobstructed from the trailing edge apertures of the tube, said shell having its interior surface of its leading edge transverely corregated to provide greater surface area, said shell having a spanwise slot in its trailing edge to allow egress of cooling air and pedestals interconnecting the trailing edge portions of the two flanks, and said shell further having holes extending from the interior to the exterior of the same to allow cooling air to flow from inside the shell to film cool the outer surface of the same.

2. A vane or blade as claimed in claim 1 in which the interior of the trailing edge of said shell is provided with chordwise extending streamline struts interconnecting the two flanks of the shell.

3. A vane or blade as claimed in claim 1 and in which said film cooling holes in said shell are disposed in rows which extend spanwise of the blade.

4. A vane or blade as claimed in claim 3 and in which one of said rows of holes is at least adjacent the leading edge of the shell.

* * * * *